(12) United States Patent
Youn et al.

(10) Patent No.: US 10,812,768 B2
(45) Date of Patent: Oct. 20, 2020

(54) ELECTRONIC DEVICE FOR RECORDING IMAGE BY USING MULTIPLE CAMERAS AND OPERATING METHOD THEREOF

(71) Applicant: SAMSUNG ELECTRONICS CO., LTD., Suwon-si, Gyeonggi-do (KR)

(72) Inventors: Joon-Ho Youn, Yongin-si (KR); Woo-Hyun Baek, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/182,922

(22) Filed: Nov. 7, 2018

(65) Prior Publication Data

US 2019/0141307 A1  May 9, 2019

(30) Foreign Application Priority Data

Nov. 7, 2017  (KR) ........................ 10-2017-0147431

(51) Int. Cl.
*H04N 9/79* (2006.01)
*H04N 5/225* (2006.01)
*G03B 17/20* (2006.01)
*H04N 5/232* (2006.01)
(Continued)

(52) U.S. Cl.
CPC ........... *H04N 9/7921* (2013.01); *G03B 17/20* (2013.01); *H04N 5/2258* (2013.01); *H04N 5/23216* (2013.01); *H04N 5/23245* (2013.01); *H04N 5/23254* (2013.01); *H04N 5/23296* (2013.01);
(Continued)

(58) Field of Classification Search
CPC ....................... H04N 9/7921; H04N 5/232941
See application file for complete search history.

(56) References Cited

U.S. PATENT DOCUMENTS

| 5,251,027 A | 10/1993 | LaBeau |
| 2002/0110286 A1 | 8/2002 | Cheatle et al. |

(Continued)

OTHER PUBLICATIONS

Extended Search Report dated Mar. 22, 2019 in counterpart European Patent Application No. 18204918.9.

*Primary Examiner* — Girumsew Wendmagegn
(74) *Attorney, Agent, or Firm* — Nixon & Vanderhye P.C.

(57) ABSTRACT

Disclosed are an electronic device for recording an image using multiple cameras and an operating method thereof. The electronic device may include: a first camera configured to acquire an image at a first frame rate; a second camera configured to acquire an image at a second frame rate higher than the first frame rate; a memory; and a processor, wherein the processor is configured to: identify first capturing attributes corresponding to the first camera; set at least some of second capturing attributes corresponding to the second camera, to correspond to the first capturing attributes; acquire a first image set corresponding to an external object through the first camera based on a signal for capturing the external object; identify whether a designated condition related to a frame rate increase is satisfied; acquire a second image set corresponding to the external object at the second frame rate through the second camera when the designated condition is satisfied; and store, in the memory, at least some first images from the first image set and at least some second images from the second image set, as an image corresponding to the external object.

20 Claims, 17 Drawing Sheets

(51) Int. Cl.
    *H04N 5/247*      (2006.01)
    *H04N 5/77*       (2006.01)
(52) U.S. Cl.
    CPC ....... *H04N 5/232941* (2018.08); *H04N 5/247*
                    (2013.01); *H04N 5/772* (2013.01)

(56) References Cited

U.S. PATENT DOCUMENTS

| | | | |
|---|---|---|---|
| 2008/0211941 A1* | 9/2008 | Deever | H04N 5/2258 |
| | | | 348/262 |
| 2012/0044372 A1 | 2/2012 | Cote et al. | |
| 2014/0085489 A1* | 3/2014 | Crisan | H04N 5/235 |
| | | | 348/207.1 |
| 2014/0132735 A1 | 5/2014 | Lee et al. | |
| 2015/0138406 A1 | 5/2015 | Sokeila et al. | |
| 2016/0112650 A1 | 4/2016 | Laroia et al. | |
| 2016/0140733 A1 | 5/2016 | Gu et al. | |
| 2016/0219254 A1* | 7/2016 | Hu | H04N 7/186 |
| 2016/0316147 A1 | 10/2016 | Bernstein et al. | |
| 2017/0013192 A1 | 1/2017 | Yang | |
| 2019/0199926 A1* | 6/2019 | An | H04N 5/225 |

* cited by examiner

ELECTRONIC DEVICE FOR RECORDING IMAGE BY USING MULTIPLE CAMERAS AND OPERATING METHOD THEREOF

CROSS-REFERENCE TO RELATED APPLICATION

This application is based on and claims priority under 35 U.S.C. § 119 to Korean Patent Application Serial No. 10-2017-0147431, which was filed in the Korean Intellectual Property Office on Nov. 7, 2017, the disclosure of which is incorporated by reference herein in its entirety.

TECHNICAL FIELD

The disclosure relates to an electronic device, and an operating method thereof, for recording an image using multiple cameras.

BACKGROUND

An electronic device may generate a moving image file by capturing multiple frames through use of a camera. Nowadays, there is provided an electronic device including a camera which supports image capturing performed at a high-speed frame rate. Since an electronic device performs capturing at a high-speed frame rate, it can acquire multiple frames within a short period of time, thus making it possible to capture images in slow motion.

When low-speed frame capturing is performed using, for example, one camera module, an electronic device configures the settings of the camera module to correspond to low-speed frame capturing, thereby allowing it to perform low-speed frame capturing. Additionally, when high-speed frame capturing is performed using, for example, one camera module, the electronic device configures the settings of the camera module to correspond to high-speed frame capturing, thereby allowing it to perform high-speed frame capturing.

While recording an image at a low-speed frame rate, an electronic device may be required to change from a low-speed frame rate to a high-speed frame rate and record an image. That is, the user may require capturing to be performed such that some moving image files include a frame captured at a low-speed frame rate and that others thereamong include a frame captured at a high-speed frame rate. When the frame rate is changed while recording an image, the electronic device needs to stop the existing recording operation and change a frame rate. Also, the electronic device needs to stop the existing recording operation and perform an operation configured to change to a new frame rate, and thus it requires additional time to perform the configured operation. Accordingly, the user cannot accurately record an image at a high-speed frame rate at the desired moment. Furthermore, even when the user records an image at a high-speed frame rate, it may be inappropriate for the acquired frame to be recorded at the high-speed frame rate.

SUMMARY

Example embodiments of the present disclosure provide an electronic device, and an operating method thereof, which can change a frame rate without interrupting a frame during execution of recording using multiple cameras, and can perform recording at the changed frame rate.

According to an aspect of the present disclosure, an electronic device is provided. The electronic device may include: a first camera configured to acquire an image at a first frame rate; a second camera configured to acquire an image at a second frame rate higher than the first frame rate; a memory; and a processor, wherein the processor is configured to: identify first capturing attributes corresponding to the first camera; set at least some of second capturing attributes corresponding to the second camera, to correspond to the first capturing attributes; acquire a first image set corresponding to an external object through the first camera based on a signal for capturing the external object; determine whether a designated condition related to a frame rate increase is satisfied; acquire a second image set corresponding to the external object at the second frame rate through the second camera when the designated condition is satisfied; and store, in the memory, at least some first images from the first image set and at least some second images from the second image set, as an image corresponding to the external object.

According to another aspect of the present disclosure, an operating method of an electronic device is provided. The operating method may include: identifying first capturing attributes of a first camera configured to acquire an image at a first frame rate; setting at least some of second capturing attributes of a second camera configured to acquire an image at a second frame rate higher than the first frame rate, to correspond to the first capturing attributes; acquiring a first image set corresponding to an external object through the first camera based on a signal for capturing the external object; determining whether a designated condition related to a frame rate increase is satisfied; acquiring a second image set corresponding to the external object at the second frame rate through the second camera when the designated condition is satisfied; and storing at least some first images from the first image set and at least some second images from the second image set, as an image corresponding to the external object.

According to yet another aspect of the present disclosure, an electronic device is provided. The electronic device may include: a first camera; a second camera; a memory; and a processor, wherein the processor is configured to: configure the first and second cameras to be operable when a request is made for recording an image of an external object; acquire first images at a first frame rate through the first camera; acquire second images at a second frame rate higher than the first frame rate through the second camera, in response to a command for changing the first frame rate; and store the image of the external object in a memory using at least some of the first images and the at least some of the second images when at least some of the second images satisfy a designated condition related to the second frame rate.

An electronic device, according to various embodiments, can change a frame rate without interrupting a frame while performing recording using multiple cameras.

The electronic device, according to various embodiments, enables changing to a high frame rate at the point in time desired by a user.

BRIEF DESCRIPTION OF THE DRAWINGS

The above and other aspects, features, and advantages of certain embodiments will be more apparent from the following detailed description, taken in conjunction with the accompanying drawings, in which.

DETAILED DESCRIPTION

Figure 1:
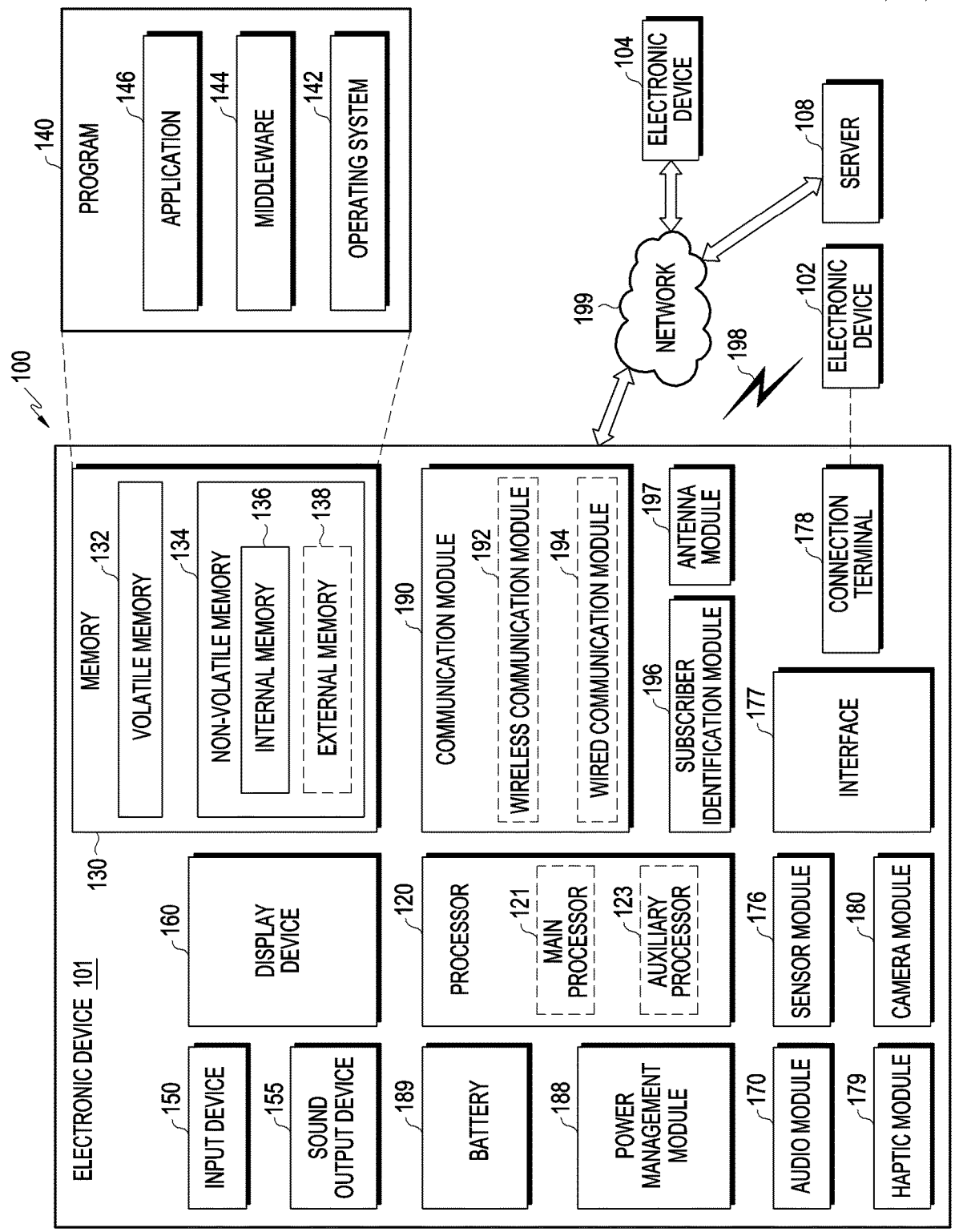
FIG. 1 is a block diagram illustrating a configuration of an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth 198, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
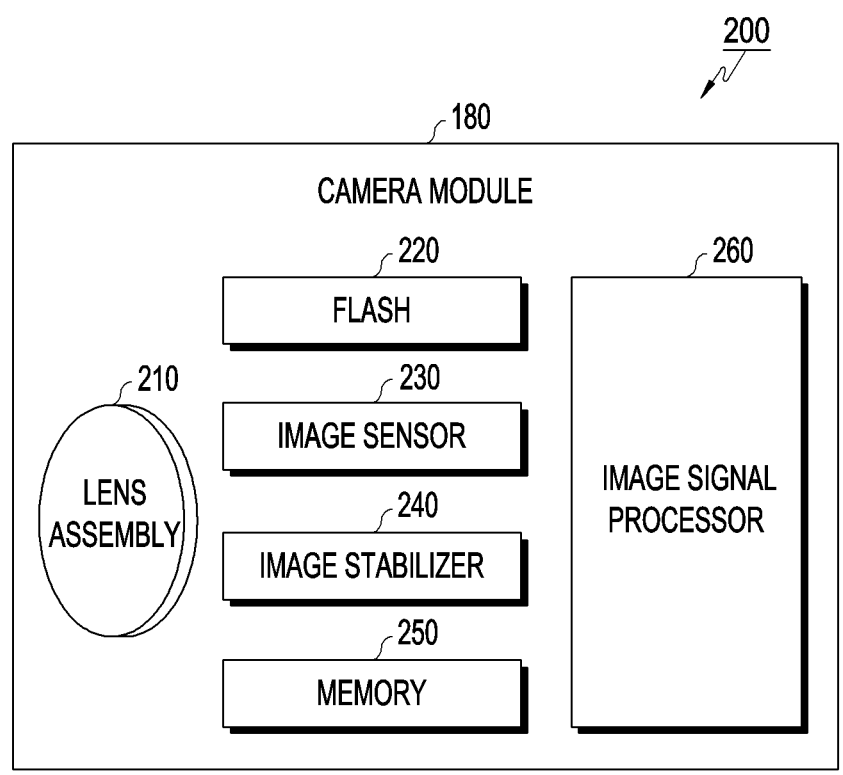
FIG. 2 is a block diagram illustrating a configuration of a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

In FIG. 2, the image signal processor 260 is illustrated as being included in the camera module 180, but this configuration is merely described by way of example. In various embodiments, the image signal processor 260 may be included in an external processor (e.g., the processor 120) of the camera module 180.

Figure 3:
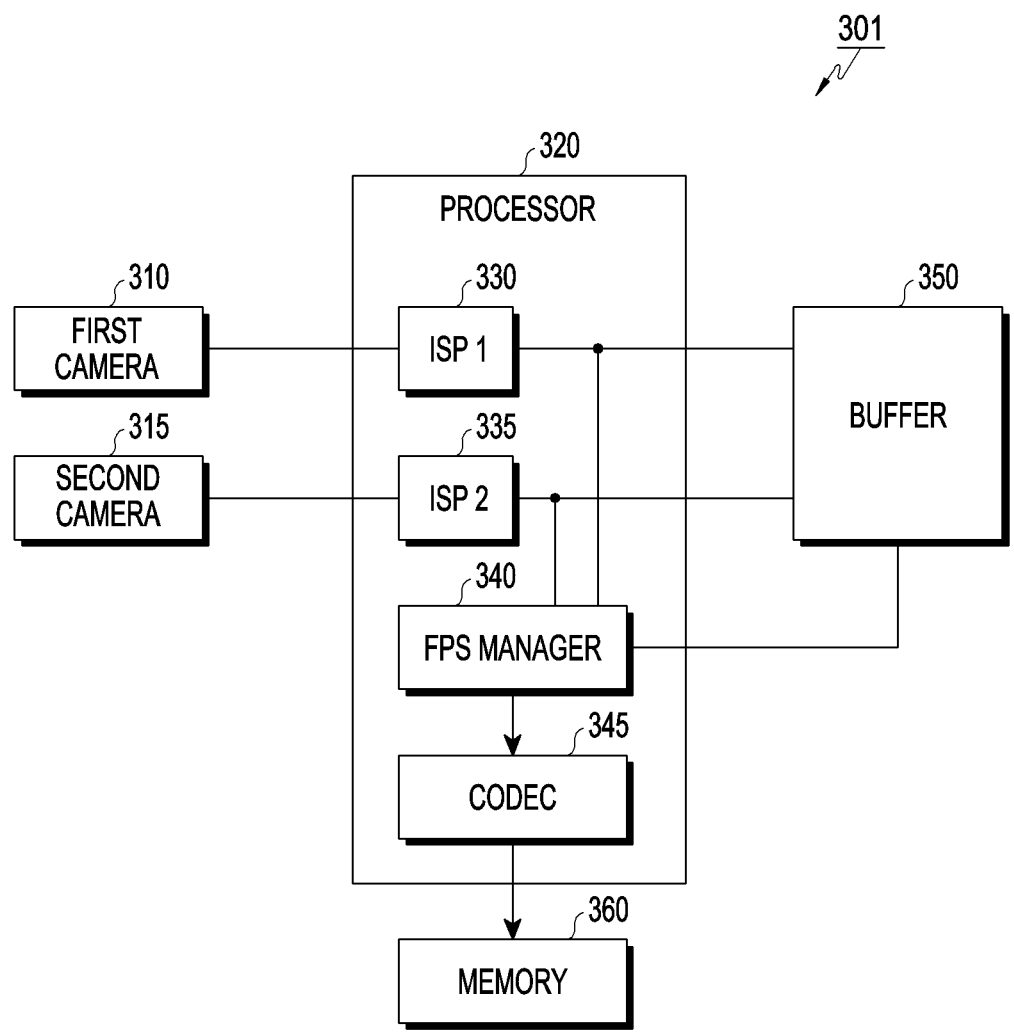
FIG. 3 is a block diagram illustrating a configuration of an electronic device according to various embodiments.

FIG. 3 is a block diagram illustrating a configuration of an electronic device 301 according to various embodiments.

Referring to FIG. 3, the electronic device 301 may include a first camera 310, a second camera 315, a processor (e.g., including processing circuitry) 320, a buffer 350, and a memory 360.

The electronic device 301 may be configured to be substantially identical or similar to the electronic device 101 of FIG. 1.

The first camera 310 may acquire an image corresponding to an external object according to a first frame rate. For example, the first camera 310 may acquire a first image (or a first image set) corresponding to the first frame rate. For example, the first camera 310 may include a low-speed camera.

The second camera 315 may acquire an image corresponding to an external object according to a second frame rate. For example, the second camera 315 may acquire a second image (or a second image set) corresponding to the second frame rate. For example, the second frame rate may be higher (e.g., greater) than the first frame rate. For example, the second camera 315 may include a high-speed camera.

The first camera 310 and the second camera 315 may be configured to be substantially identical or similar to the camera module 180 of FIGS. 1 and 2.

In FIG. 3, the electronic device 301 is illustrated as including two cameras; however, the number of cameras is not limited thereto. For example, the electronic device 301 may include multiple (e.g., more than two) cameras.

Hereinafter, for convenience of description, consideration is given to, and a description will be made for, a case in which an image has the concept of including not only a still image, but also a moving image.

The processor 320 may include various processing circuitry and control the overall operation of the electronic device 301. For example, the processor 320 may be implemented to be identical or similar to the processor 120 illustrated in FIG. 1.

The processor 320 may acquire first images using the first camera 310 based on a signal for capturing an external object. In the present example, the first images may be acquired at the first frame rate.

The processor 320 may acquire second images using the second camera 315 based on a frame rate change request. In the present example, the second images may be acquired at the second frame rate. The processor 320 may simultaneously acquire first images at the first frame rate and second images at the second frame rate through the first camera 315 based on a frame rate change request.

According to an embodiment, while recording an image at the first frame rate using the first camera 310, the processor 320 may change the frame rate using the second camera 315 and may record an image at the changed frame rate (e.g., the second frame rate). For example, while acquiring first images at the first frame rate using the first camera 310, in response to a frame rate change request, the processor 320 may acquire second images at the second frame rate using the second camera 315. In the present example, in response to a frame rate change request, the processor 320 may change the first frame rate to the second frame rate without interrupting a frame. Alternatively, in response to a frame rate change request, the processor 320 may seamlessly change the first frame rate to the second frame rate.

The processor 320 may record an image using at least some of the acquired first images and/or at least some of the acquired second images.

The processor 320 may include a first image signal processor (e.g., including processing circuitry and/or program elements) 330, a second image signal processor (e.g., including processing circuitry and/or program elements) 335, a frame rate manager (hereinafter, a Frames Per Second (FPS) manager) (e.g., including processing circuitry and/or program elements) 340, and a coder/decoder (e.g., codec) 345.

The first image signal processor 330 may process the first images (or frames) acquired through the first camera 310. For example, the first image signal processor 330 may process the first images (or frames) of the first frame rate. The first image signal processor 330 may store, in the buffer 350, the first images acquired through the first camera 310.

The first image signal processor 330 may be connected to the first camera 310 through, for example, and without limitation, an MIPI.

The second image signal processor 335 may process the second images (or frames) acquired through the second camera 315. For example, the second image signal processor 335 may process the second images of the second fame rate. The second image signal processor 335 may store, in the buffer 350, the second images acquired through the second camera 315.

The second image signal processor 335 may be connected to the second camera 315 through, for example, and without limitation, an MIPI.

The FPS manager 340 may control a frame rate change-related operation. For example, the FPS manager 340 may be implemented as a module.

According to an embodiment, while recording an image using the first camera 310, the FPS manager 340 may detect an event which requests a frame rate change (e.g., which requests an increase in frame rate). For example, the FPS manager 340 may detect the event based on user input. Also, the FPS manager 340 may analyze the first images acquired through the first camera 310, and may detect the occurrence of the event when the result of the analysis of the first images satisfies a designated condition.

According to an embodiment, the FPS manager 340 may analyze frames of at least some of the first images, and may determine whether the analyzed frames are appropriate for the second frame rate. For example, the FPS manager 340 may determine whether frames of at least some of the first images are appropriate for the second frame, based on at least one of brightness (or illuminance) of the frames and a motion included in the frames.

When a designated condition related to a frame rate change is satisfied, the FPS manager 340 may acquire second images using the second camera 315. The FPS manager 340 may determine whether the second images are appropriate for the second frame rate.

According to an embodiment, the FPS manager 340 may analyze frames of at least some of the second images, and may determine whether the analyzed frames are appropriate for the second frame rate. For example, the FPS manager 340 may determine whether frames of at least some of the second images are appropriate for the second frame rate, based on at least one of brightness (or illuminance) of the frames and a motion included in the frames.

According to an embodiment, the FPS manager 340 may determine which frame rate is appropriate for image recording among the first frame rate and the second frame rate. For example, the FPS manager 340 may determine which frame rate is appropriate for image recording by comparing frames included in the first images of the first frame rate with frames included in the second images of the second frame rate.

According to an embodiment, the FPS manager 340 may determine one of the first and second frame rates at which images to be transmitted to the codec 345 have been acquired.

According to an embodiment, in order to record an image, the FPS manager 340 may set attributes related to the first and second cameras 310 and 320. For example, the FPS manager 340 may set the view angle, the exposure, the white balance, the effect, and/or the like for each of the first and second cameras 310 and 320.

According to an embodiment, the FPS manager 340 may configure the first camera 310 to have a view angle, an exposure, a white balance, an effect, and/or the like identical to those of the second camera 315.

The codec 345 may receive, from the FPS manager 340, at least some of the first images and at least some images of a second image set. The codec 345 may store the at least some of the first images and the at least some images of the second image set in the memory 360 as an image corresponding to an external object.

The buffer 350 may store the first images and second images. Under the control of the processor 320, the buffer 350 may transmit the first images and/or the second images to the codec 345. Also, under the control of the processor 320, the buffer 350 may delete the first images or the second images. For example, the buffer 350 may be implemented by a volatile memory.

The memory 360 may store an image corresponding to an external object. The memory 360 may be configured to be substantially identical or similar to the memory 130 of FIG. 1. For example, the memory 360 may be implemented by a non-volatile memory.

Figure 4:
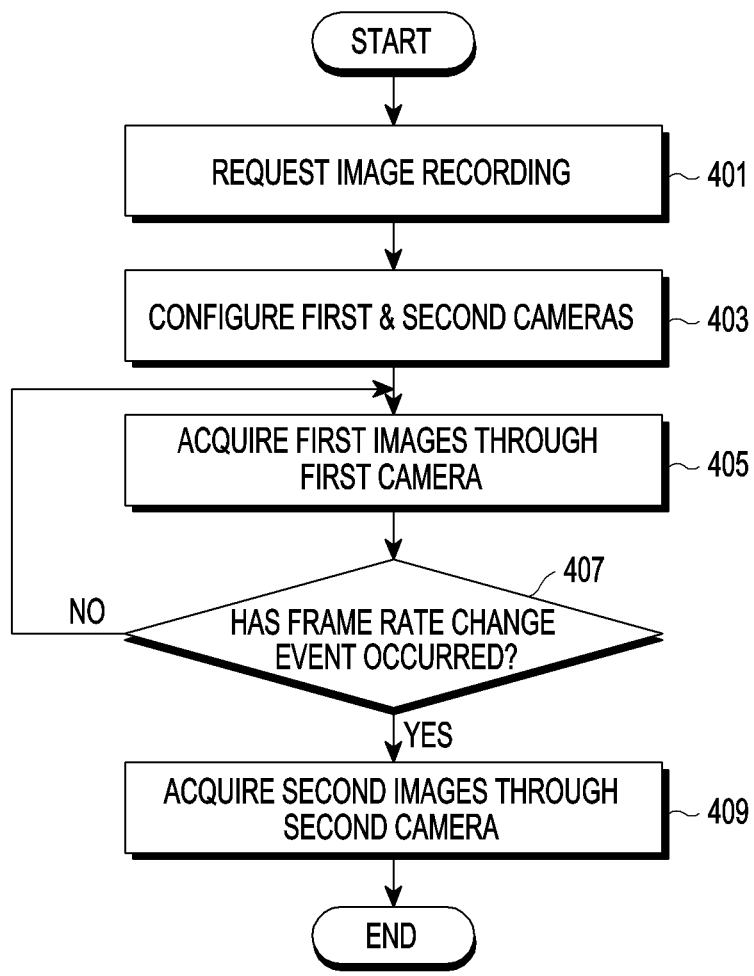
FIG. 4 is a flowchart illustrating an operation of an electronic device according to various embodiments.

FIG. 4 is a flowchart illustrating an operation of an electronic device according to various embodiments.

Referring to FIG. 4, in operation 401, the electronic device (the electronic device 301 of FIG. 3) (e.g., the processor 120 or 320) may receive a recording request made by a user. For example, when the user executes a particular application (e.g., a camera application), the electronic device 301 may determine that a recording request has occurred. Alternatively, when a recording button is designated on an execution screen of a camera application, the electronic device 301 may determine that a recording request has occurred.

In operation 403, the electronic device 301 may set the configuration related to operations of a first camera (the first camera 310 of FIG. 3) and a second camera (the second camera 315 of FIG. 3). For example, the electronic device 301 may set attributes related to operations of the first camera 310 and the second camera 315 so that an image can be recorded using the first camera 310 and the second camera 315. The electronic device 301 may set the frame rate, the view angle, the brightness, the white balance, the effect, and/or like so that an image can be recorded using the first camera 310 and the second camera 315.

According to an embodiment, in response to a recording request, the electronic device 301 may simultaneously set attributes related to operations of the first camera 310 and the second camera 315.

According to another embodiment, the electronic device 301 may set an attribute related to an operation of the first camera 310 and may then set an attribute related to an operation of the second camera 315. For example, when image recording is started using the first camera 310, the electronic device 301 may set an attribute related to an operation of the second camera 315.

In operation 405, when image recording starts, the electronic device 301 may acquire first images corresponding to an external object using the first camera 310. The electronic device 301 may store an image of the external object using the first images.

In operation 407, the electronic device 301 may detect a frame rate change-related event. For example, when user input for changing a frame rate is received, the electronic device 301 may determine that the event has occurred. Alternatively, the electronic device 301 may analyze at least some of the first images and may determine that the event has occurred.

When the frame rate change-related event is detected ('Yes' in operation 407), in operation 409, the electronic device 301 may acquire second images using the second camera 315. The electronic device 301 may store at least some of the first images and at least some of the second images as an image of the external object.

Figure 5:
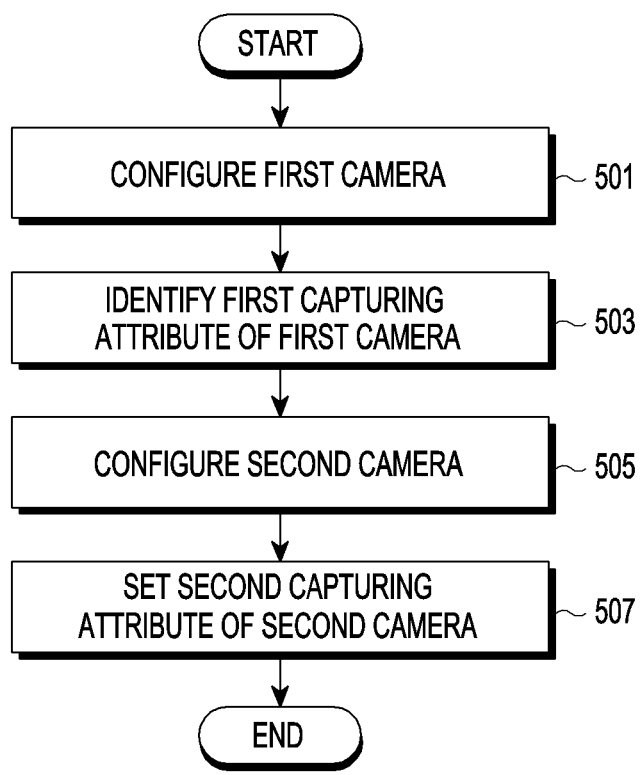
FIG. 5 is a flowchart illustrating an operation of an electronic device for configuring a first camera and a second camera to be operable according to various embodiments.

FIG. 5 is a flowchart illustrating an operation of an electronic device for configuring a first camera and a second camera to be operable according to various embodiments.

Referring to FIG. 5, in operation 501, in response to a recording request made by the user, the electronic device (e.g., the electronic device 301 of FIG. 3) (e.g., the processor 120 or 320) may configure the first camera (the first camera 310 of FIG. 3) to be operable. For example, a specific time may be required to configure the first camera 310 to be operable.

In operation 503, the electronic device 301 may identify the capturing attribute of the configured first camera 310. For example, the electronic device 301 may identify the view angle, the brightness, the white balance, the effect, and/or the like of the first camera 310. That is, the electronic device 301 may identify capturing attributes except for the frame rate of the first camera 310.

In operation 505, the electronic device 301 may configure the second camera (the second camera 315 of FIG. 3) to be operable.

In operation 507, the electronic device 301 may set the capturing attribute of the second camera 315 based on the capturing attribute of the first camera 310. For example, the electronic device 301 may configure capturing attributes except for the frame rate of the second camera 315 to be identical to those of the first camera 310.

At a point in time when the first camera 310 is configured to be operable, the electronic device 301 may configure the second camera 315 to be operable. Also, at the point in time when the first camera 310 is configured to be operable, the electronic device 301 may set a capturing attribute of the second camera 315.

Alternatively, before or when the electronic device 301 starts recording using the first camera 310, the electronic device 301 may configure the second camera 315 to be operable. Also, before or when the electronic device 301 starts recording, the electronic device 301 may set a capturing attribute of the second camera 315.

The electronic device 301 may require a specific time to configure the second camera 315 to be operable. However, since the electronic device 301 has previously configured the second camera 315 to be operable, the electronic device 301 may immediately change the frame rate using the second camera 315 at the point in time desired by the user and may acquire images at the changed frame rate.

The electronic device 301 may acquire second images at a second frame rate using the second camera 315 based on a frame rate change event.

The electronic device 301 may store an image (or video) corresponding to an external object using at least some of the first images and/or at least some of the second images.

Figure 6:
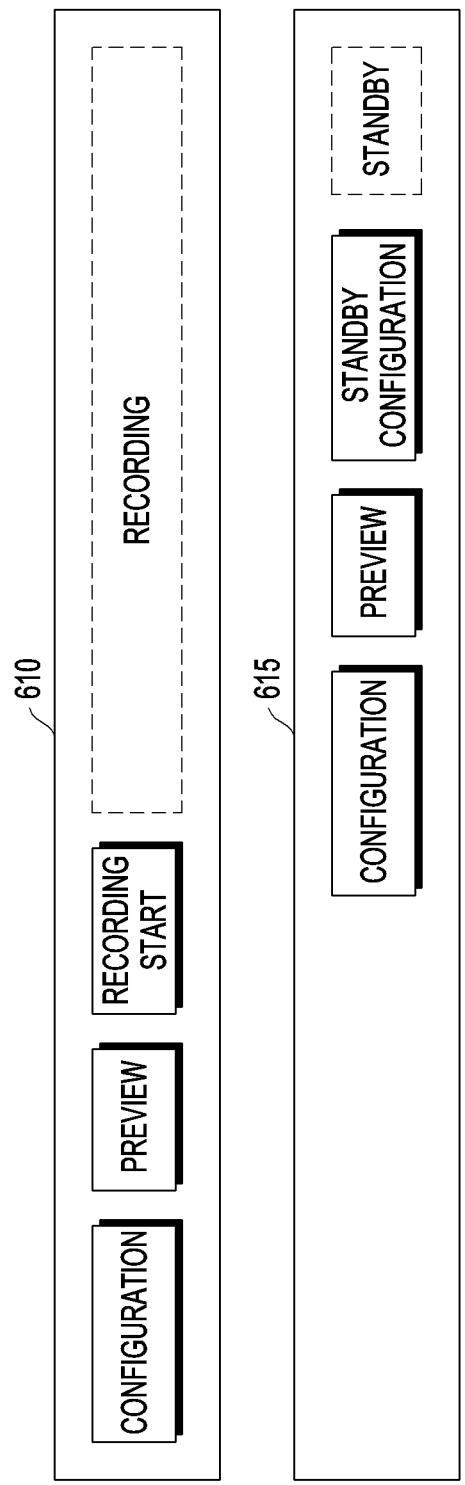
FIG. 6 is a timing diagram illustrating an operation of an electronic device for configuring a first camera and a second camera to be operable according to various embodiments.

FIG. 6 is a timing diagram illustrating an operation of an electronic device for configuring a first camera and a second camera to be operable according to various embodiments.

Referring to FIG. 6, the first camera 610 may be configured to be substantially identical or similar to the first camera 310 of FIG. 3. The second camera 615 may be configured to be substantially identical or similar to the second camera 315 of FIG. 3.

The processor (e.g., the processor 320 of FIG. 3) may configure the first camera 610 to be operable. For example, when a recording request is detected, the processor 320 may configure the first camera 610 to be operable.

For example, a configuration operation for the first camera 610 may, for example, include a configuration step, a preview step, and a recording start step. The configuration step may signify the step for configuring the first camera 610 to be operable. Also, the configuration step may include the step for setting a capturing attribute of the first camera 610. The preview step may signify the step for acquiring a preview image through the first camera 610 based on the set capturing attribute. The recording start step may signify the step for entering a state in which recording can be started using the first camera 610.

When the configuration operation for the first camera 610 is completed, the processor 320 may record an image using the first camera 610. For example, when the configuration operation is completed, the processor 320 may acquire first images using the first camera 610, and may store an image of an external object using at least some of the first images.

The processor 320 may configure the first camera 610 to be operable and may configure the second camera 615 to be operable. For example, the processor 320 may simultaneously configure the first and second cameras 610 and 615 to be operable. Alternatively, the processor 320 may start a configuration operation for the first cameras 610, and then may start a configuration operation for the second cameras 615. In the present example, when or before the processor 320 starts recording using the first cameras 610, the processor 320 may configure the second cameras 615 to be operable.

For example, a configuration operation for the second camera 615 may, for example, include a configuration step, a preview step, and a standby configuration step. The configuration operation may signify the step for configuring the second cameras 615 to be operable. Also, the configuration operation may include the step for setting a capturing attribute of the second camera 615. The preview step may signify the step for acquiring a preview image through the second cameras 615 based on the set capturing attribute. The standby configuration step may signify the step for entering a state of waiting for recording using the second camera 615 to start.

When the configuration operation for the second camera 615 is completed, the processor 320 may keep the second camera 615 in a standby state. For example, until a frame rate change event is detected, the processor 320 may keep the second camera 615 in a standby state. For example, the standby state may signify a sleep state. When a frame rate change event is detected, the processor 320 may activate the second camera 615.

Figure 7:
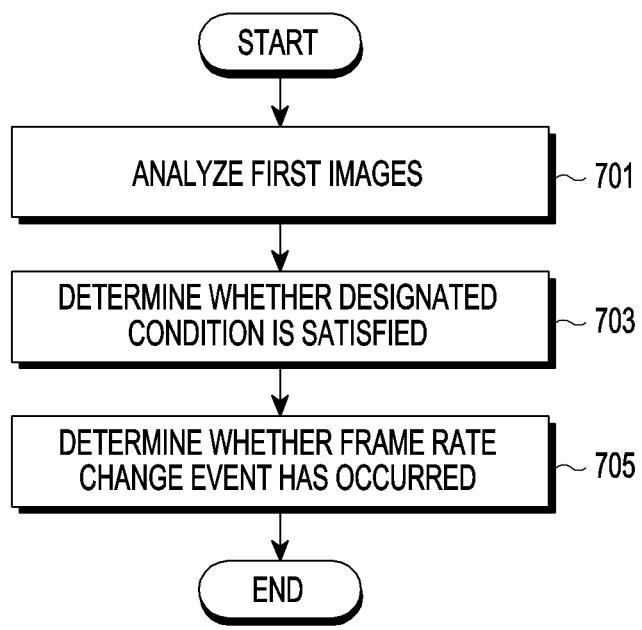
FIG. 7 is a flowchart illustrating an operation of an electronic device for determining a frame rate change event according to various embodiments.

FIG. 7 is a flowchart illustrating an operation of an electronic device for determining a frame rate change event according to various embodiments.

Referring to FIG. 7, the electronic device (the electronic device 301 of FIG. 3) (e.g., the processor 120 or 320) may detect a frame rate change event. For example, a frame rate change event may signify an event for increasing a frame rate.

According to an embodiment, when user input is received, the electronic device 301 may determine that a frame rate change event has been received.

According to an embodiment, in operation 701, the electronic device 301 may detect a frame rate change event by analyzing first images acquired through the first camera (the first camera 310 of FIG. 3).

In operation 703, the electronic device 301 may determine whether at least one frame included in the first images satisfies a designated condition. For example, whether the designated condition is satisfied may be determined based on the degree of brightness of at least one frame included in the first images, the motion of an external object included in the frame, and/or the degree of movement of an external object included in the frame.

When the at least one frame included in the first images satisfies a designated condition, in operation 705, the electronic device 301 may determine that a frame rate change event has occurred.

When the designated condition is satisfied, the electronic device 301 may perform an operation of changing the frame rate.

Figure 8:
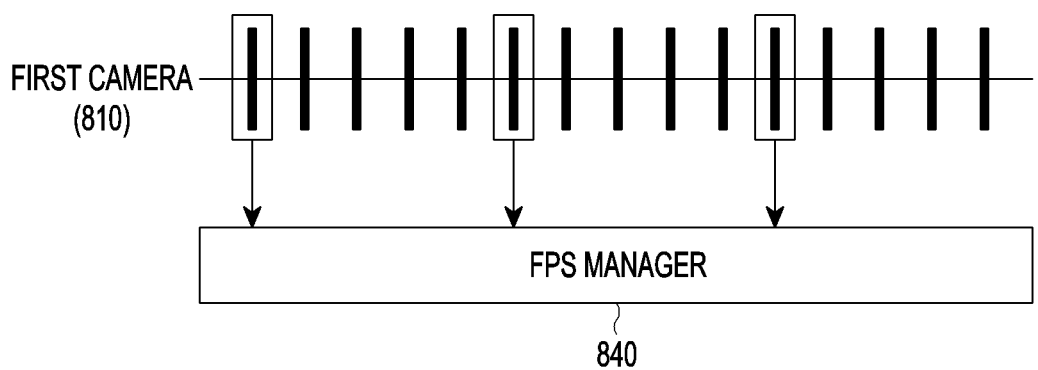
FIG. 8 is a block diagram illustrating an operation of an electronic device for determining a frame rate change event according to various embodiments.

FIG. 8 is a block diagram illustrating an operation of an electronic device for determining a frame rate change event according to various embodiments.

Referring to FIG. 8, a first camera 810 may be configured to be substantially identical or similar to the first camera 310 of FIG. 3. An FPS manager (e.g., including processing circuitry and/or program elements) 840 may be configured to be substantially identical or similar to the FPS manager 340 of FIG. 3.

The FPS manager 840 may analyze first images acquired through the first camera 810. For example, the FPS manager 840 may analyze at least one frame included in the first images.

The FPS manager 840 may extract a designated number of frames from among frames included in the first images and may analyze the extracted frames. For example, the FPS manager 840 may extract one frame for every five frames and may analyze the extracted frame.

The FPS manager 840 may analyze the degree of brightness of the extracted frame, the motion of an external object included in the frame, and/or the degree of movement of an external object included in the frame. For example, the FPS manager 840 may determine that an event for increasing a frame rate has occurred, when, for example, the degree of brightness of the extracted frame is greater than or equal to a designated brightness; the motion of an external object included in the frame is a designated motion; and the degree of movement of an external object included in the frame has a value greater than or equal to a designated value.

Figure 9:
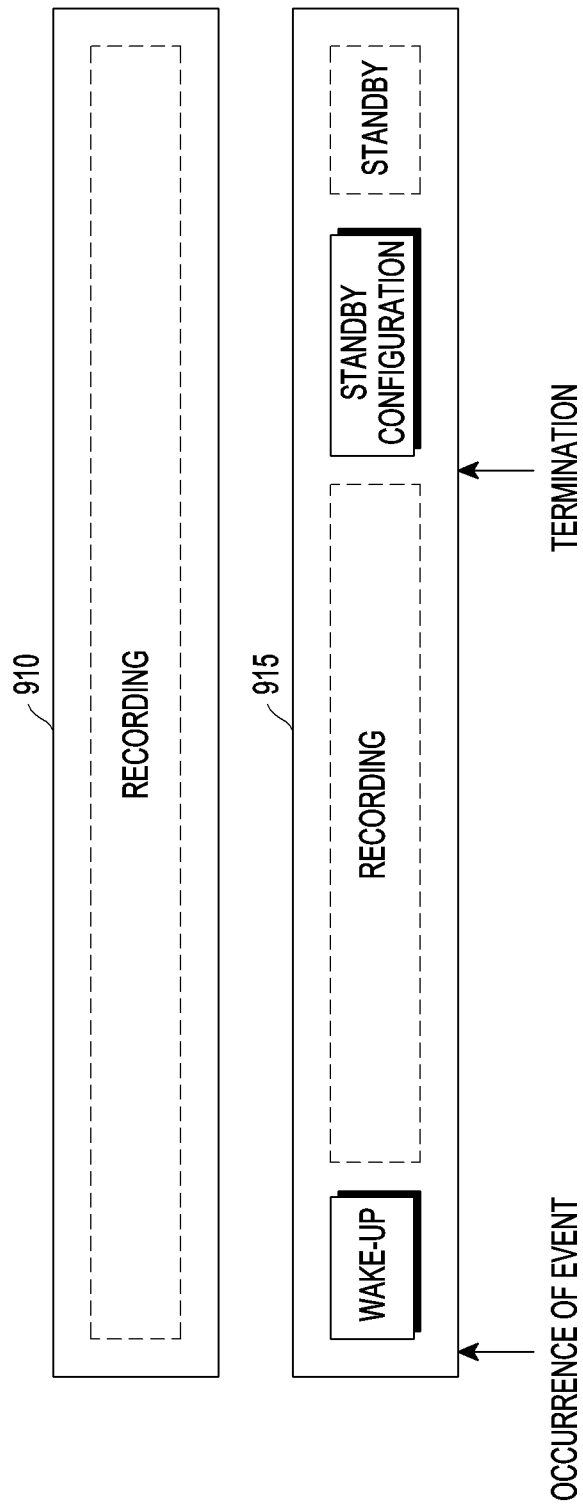
FIG. 9 is a timing diagram illustrating an operation of an electronic device for changing a frame rate according to various embodiments.

FIG. 9 is a timing diagram illustrating an operation of an electronic device for changing a frame rate according to various embodiments.

Referring to FIG. 9, a first camera 910 may be configured to be substantially identical or similar to the first camera 310 of FIG. 3. A second camera 915 may be configured to be substantially identical or similar to the second camera 315 of FIG. 3.

The processor (e.g., the processor 320 of FIG. 3) may perform a recording operation using the first camera 910. For example, the processor 320 may acquire first images at a first frame rate through the first camera 910.

The processor 320 may detect a frame rate change event while performing a recording operation using the first camera 910.

When the event occurs, the processor 320 may activate the second camera 915, which is in a standby state. For example, the processor 320 may wake-up (or activate) the second camera 915 in response to an event occurring.

When the second camera 915 is activated, the processor 320 may perform a recording operation using the second camera 915. For example, the processor 320 may acquire second images at a second frame rate using the second camera 915. In the present example, the processor 320 may also acquire first images through the first camera 910 in addition to acquiring second images through the second camera 915. For example, the processor 320 may acquire the first images and second images at the first and second frame rates through the first and second cameras 910 and 915, respectively.

The processor 320 may store the first images of the first frame rate and the second images of the second frame rate in a buffer (e.g., the buffer 350 of FIG. 3).

When a frame rate change is terminated, the processor 320 may again put the second camera 915 in a standby state. For example, the processor 320 may configure a standby state for the second camera 915 and enable the second camera 915 to enter the standby state when the configuration is completed.

Figure 10:
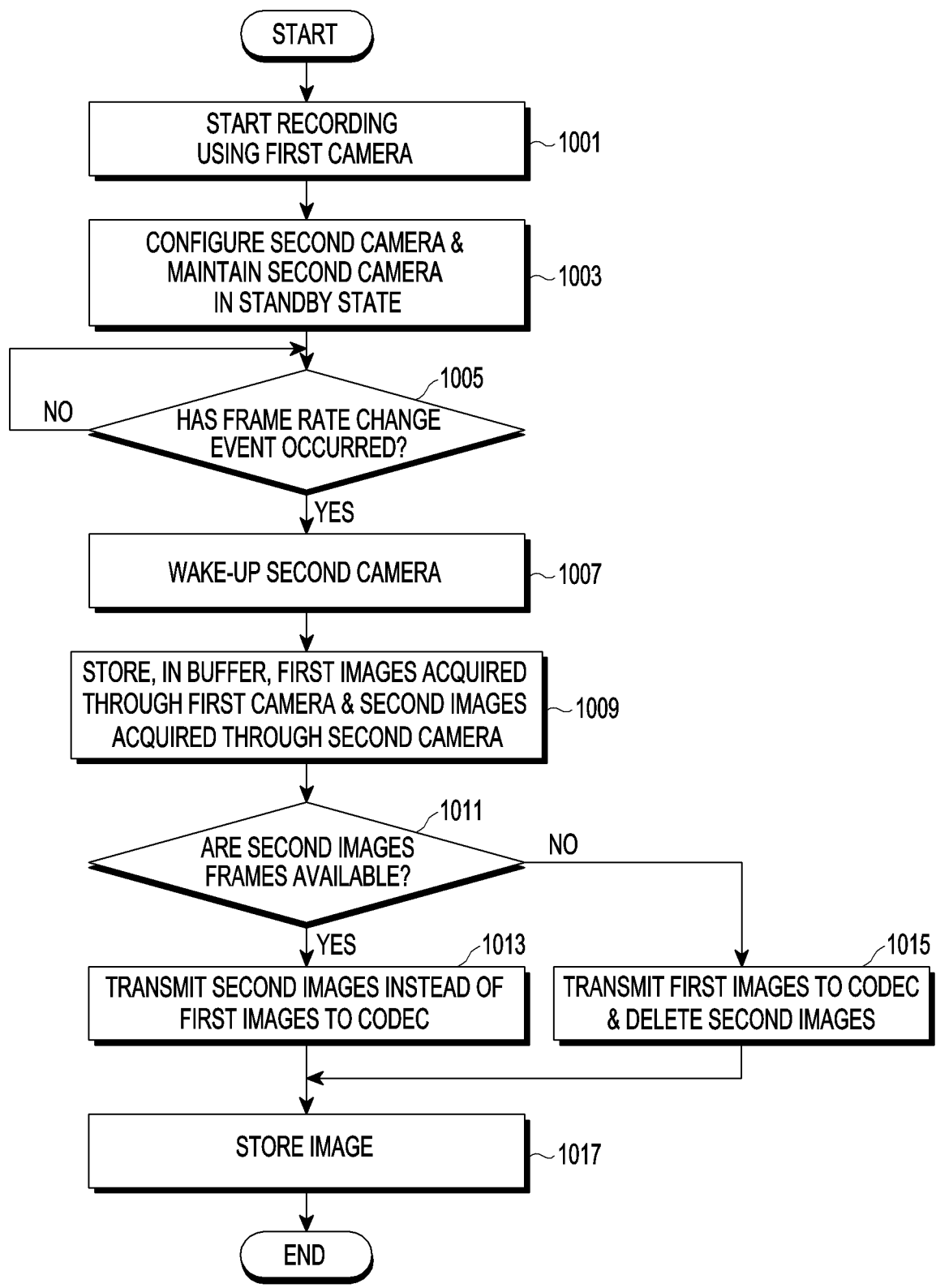
FIG. 10 is a flowchart illustrating an operation of an electronic device for changing a frame rate according to various embodiments.

FIG. 10 is a flowchart illustrating an operation of an electronic device for changing a frame rate according to various embodiments.

Referring to FIG. 10, in operation 1001, in response to a recording request made by the user, the electronic device (the electronic device 301 of FIG. 3) (e.g., the processor 120 or 320) may start recording an image (or video) of an external object using a first camera (the first camera 310 of FIG. 3).

In operation 1003, the electronic device 301 may set an operational configuration of a second camera (the second camera 315 of FIG. 3) and may keep the second camera 315 in a standby state.

In operation 1005, the electronic device 301 may determine whether a frame rate change event has occurred.

When a frame rate change event has occurred ('Yes' in operation 1005), in operation 1007, the electronic device 301 may activate the second camera 315.

In operation 1009, the processor 320 may store first images of a first frame rate through the first camera 310 and second images of a second frame rate through the second camera 315 in a buffer (e.g., the buffer 350 of FIG. 3).

In operation 1011, the processor 320 may determine whether the second images are frames available at the second frame rate. For example, the processor 320 may analyze at least one frame included in the second images and may determine whether the second images are frames available at the second frame rate based on an analysis result.

When the second images are frames available at the second frame rate ('Yes' in operation 1011), in operation 1013, the processor 320 may transmit the second images, instead of the first images, to a codec during a period in which the second images are acquired. The processor 320 may delete the first images stored in the buffer 350.

When the second images are not frames available at the second frame rate ('No' in operation 1011), in operation 1015, the processor 320 may transmit the first images to the codec during the period in which the second images are acquired. The processor 320 may delete the second images stored in the buffer 350.

In operation 1017, the processor 320 may store an image corresponding to an external object using at least some of the first images and at least some of the second images.

Figure 11:
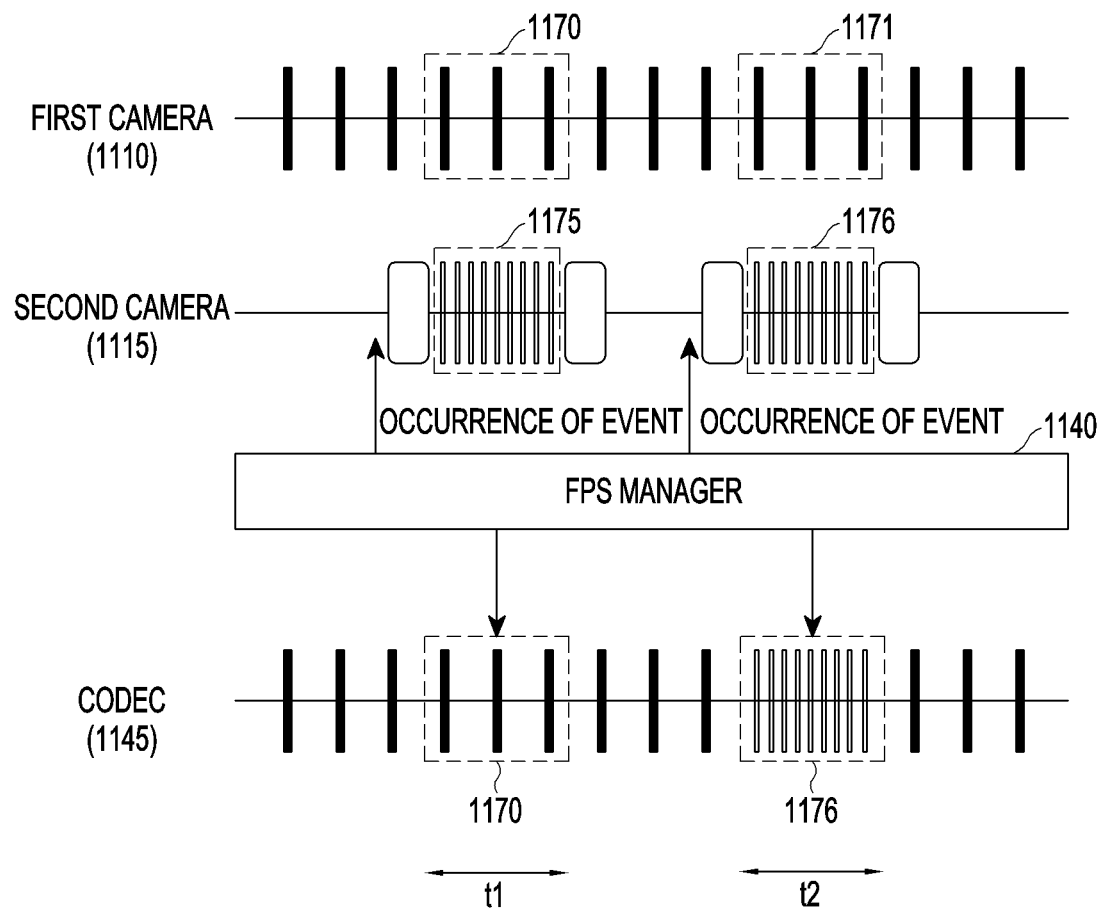
FIG. 11 is a diagram illustrating an operation of an electronic device according to various embodiments.

FIG. 11 is a diagram illustrating an operation of an electronic device according to various embodiments.

Referring to FIG. 11, a first camera 1110 may be configured to be substantially identical or similar to the first camera 310 of FIG. 3, and a second camera 1115 may be configured to be substantially identical or similar to the second camera 315 of FIG. 3. Also, an FPS manager (e.g., including processing circuitry and/or program elements) 1140 may be configured to be substantially identical or similar to the FPS manager 340 of FIG. 3, and a codec 1145 may be configured to be substantially identical or similar to the codec 345 of FIG. 3.

The FPS manager 1140 may acquire first images at a first frame rate through the first camera 1110. The FPS manager 1140 may store the first images of the first frame rate in a buffer (the buffer 350 of FIG. 3) using the first camera 1110.

When a first event for changing the frame rate occurs, the FPS manager 1140 may activate the second camera 1115. For a first time t1, the FPS manager 1140 may acquire first images 1170 at the first frame rate through the first camera 1110 and may acquire second images 1175 at a second frame rate through the second camera 1115. The FPS manager 1140 may store, in the buffer 350, the first images 1170 of the first frame rate and the second images 1175 of the second frame rate. For example, the FPS manager 1140 may not immediately transmit, to the codec 1145, the first images 1170 and the second images 1175 acquired for the first time t1.

Since the first images 1170 and the second images 1175 are simultaneously acquired at the first frame rate and the second frame rate, respectively, for the first time t1, the FPS manager 1140 may transmit, to the codec 1145, only one image set from among a set of the first images 1170 and a set of the second images 1175. Accordingly, the FPS manager 1140 may determine whether the second images 1175 are frames available at the second frame rate. According to the determination result, the FPS manager 1140 may select one image set from among a set of the first images 1170 of the first frame rate and a set of the second images 1175 of the second frame rate, and may transmit the selected image set to the codec 1145.

For example, when frames included in the second images are not frames available at the second frame rate, the FPS manager 1140 may transmit, to the codec 1145, the first images 1170 acquired at the first frame rate for the first time t1. That is, the FPS manager 1140 may transmit, to the codec 1145, the first images 1170, which have been acquired at the first frame rate for the first time t1 and are stored in the buffer 350. In the present example, the FPS manager 1140 may delete the second images 1175, which have been acquired at the second frame rate for the first time t1 and are stored in the buffer 350.

When a second event for changing a frame rate occurs, the FPS manager 1140 may activate the second camera 1115. For a second time t2, the FPS manager 1140 may acquire first images 1171 at the first frame rate through the first camera 1110 and may acquire second images 1176 at the second frame rate through the second camera 1115. The FPS manager 1140 may store the first images 1171 and the second images 1176 in the buffer 350.

Similarly, since the first images 1171 and the second images 1176 are simultaneously acquired at the first frame rate and the second frame rate, respectively, for the second time t2, the FPS manager 1140 may transmit, to the codec 1145, only one image set from among a set of the first images 1171 and a set of the second images 1176. Accordingly, the FPS manager 1140 may determine whether the second images 1176 are frames available at the second frame rate. According to a determination result, the FPS manager 1140 may select one image set from among a set of the first images 1171 of the first frame rate and a set of the second images 1176 of the second frame rate, and may transmit the selected one image set to the codec 1145.

For example, when frames included in the second images are frames available at the second frame rate, the FPS manager 1140 may transmit, to the codec 1145, the second images 1176 acquired at the second frame rate for the second time t2. That is, the FPS manager 1140 may transmit, to the codec 1145, the second images 1176, which have been acquired at the second frame rate for the second time t2 and are stored in the buffer 350. In the present example, the FPS manager 1140 may delete the first images 1171 which have been acquired at the first frame rate for the second time t2 and are stored in the buffer 350.

The FPS manager 1140 may store an image corresponding to an external object using at least some of the first images (e.g., images except for the images 1171 corresponding to a period of the second time t2) and using at least some of the second images (e.g., the images 1176 corresponding to the period of the second time t2).

Figure 12:
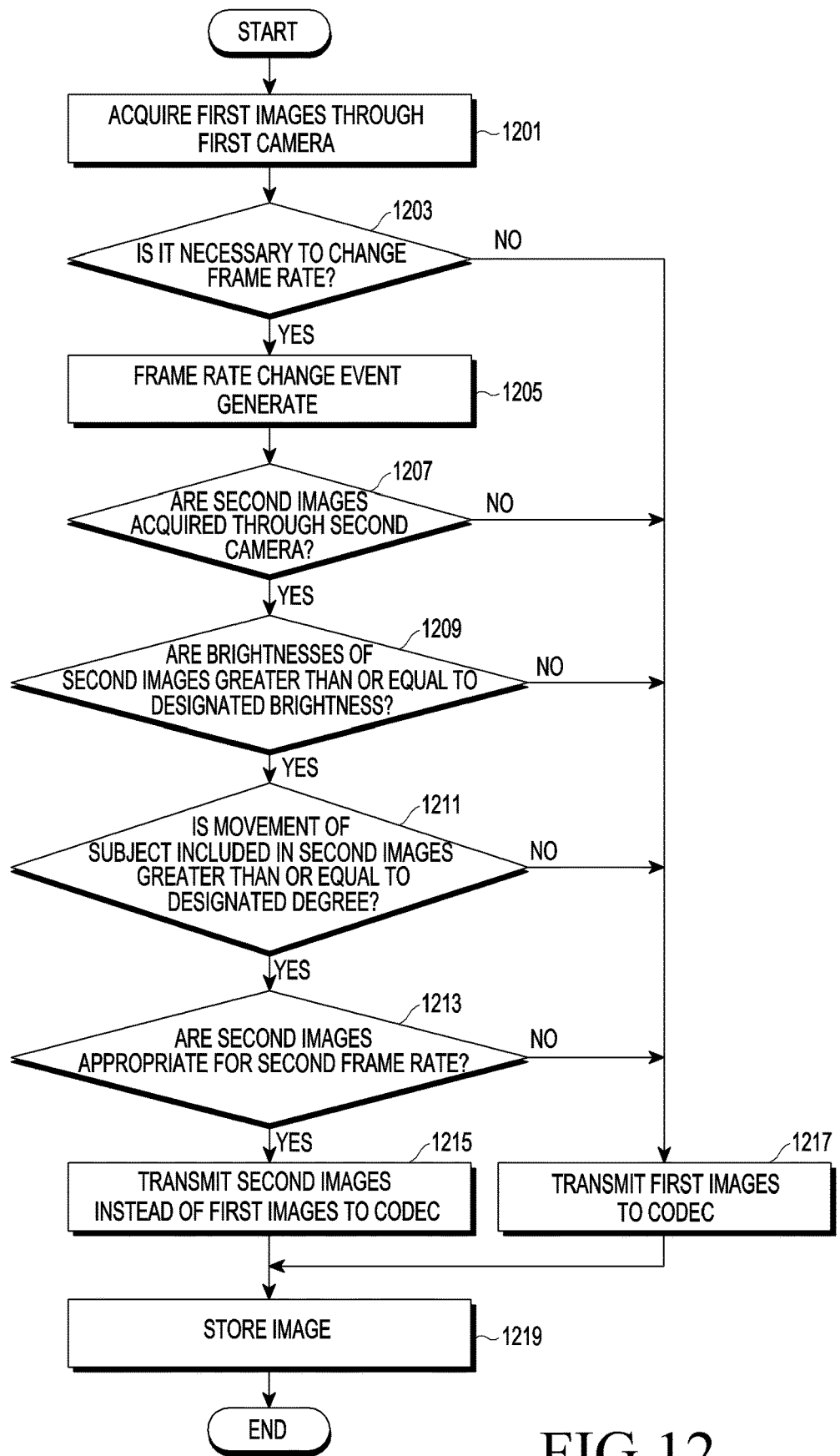
FIG. 12 is a flowchart illustrating an operation of an electronic device for changing a frame rate according to various embodiments.

FIG. 12 is a flowchart illustrating an operation of an electronic device for changing a frame rate according to various embodiments.

Referring to FIG. 12, in operation 1201, to record an image (or video) of an external object, the electronic device (the electronic device 301 of FIG. 3) (e.g., the processor 120 or 320) may acquire first images at a first frame rate through a first camera (the first camera 310 of FIG. 3). The electronic device 301 may transmit the first images of the first frame rate to a codec (e.g., the codec 345 of FIG. 3).

In operation 1203, the electronic device 301 may determine whether it is necessary to change a frame rate. For example, the electronic device 301 may determine, at a user's request or automatically, whether it is necessary to change a first frame rate to a higher frame rate.

When it is not necessary to change a frame rate ('No' in operation 1203), the electronic device 301 may transmit the first images of the first frame rate to the codec (e.g., the codec 345 of FIG. 3) in operation 1217.

When it is necessary to change a frame rate ('Yes' in operation 1203), in operation 1205, the electronic device 301 may generate a frame rate change event. In response to the frame rate change event, the electronic device 301 may activate a second camera (e.g., the second camera 315 of FIG. 3).

In operation 1207, the electronic device 301 may acquire second images through the second camera. For example, until second images are acquired through the second camera 315, the electronic device 301 may transmit the first images to the codec 345.

When second images are acquired, the electronic device 301 may determine whether at least one frame included in the acquired second images is a frame available at a second frame rate.

In operation 1209, the electronic device 301 may determine whether the brightness of at least one frame included in the second images is greater than or equal to a designated brightness. For example, when the brightness of the at least one frame included in the second images is less than the designated brightness ('No' in operation 1209), in operation 1217, the electronic device 301 may transmit the first images instead of the second images to the codec 345. In the present example, the electronic device 301 may delete the second images.

When the brightness of the at least one frame included in the second images is greater than or equal to the designated brightness ('Yes' in operation 1209), in operation 1211, the electronic device 301 may determine the movement of the external object included in the at least one frame included in the second images. For example, when the movement of the external object included in the at least one frame included in the second images is less than a designated degree, in operation 1217, the electronic device 301 may transmit the first images instead of the second images to the codec 345. In the present example, the electronic device 301 may delete the second images.

When the movement of the external object included in the at least one frame included in the second images is greater than or equal to the designated degree ('Yes' in operation 1211), the electronic device 301 may determine whether the at least one frame included in the second images is a frame available at the second frame rate using a designated condition other than the above-described conditions. For example, the electronic device 301 may compare frames included in the first images with frames included in the second images, and may determine whether the at least one frame included in the second images is a frame available at the second frame rate based on the comparison result.

When the designated condition other than the above-described conditions is satisfied ('Yes' in operation 1213), in operation 1215, the electronic device 301 may transmit the second images instead of the first images to the codec 345. That is, the electronic device 301 may determine that the at least one frame included in the second images is a frame available at the second frame rate. In operation 1219, the electronic device 301 may store an image corresponding to the external object using at least some of the first images and second images.

When the designated condition other than the above-described conditions is not satisfied ('No' in operation 1213), in operation 1217, the electronic device 301 may delete the second images and may transmit the first images to the codec 345. That is, the electronic device 301 may determine that the at least one frame included in the second images is not a frame available at the second frame rate. In operation 1219, the electronic device 301 may store an image corresponding to the external object using only the first images.

Figure 13:
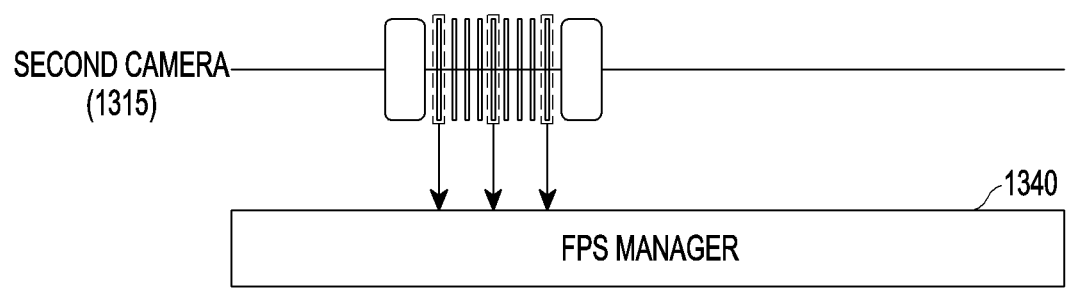
FIG. 13 is a block diagram illustrating an operation of determining whether second images include a frame available at a second frame rate according to various embodiments.

FIG. 13 is a block diagram illustrating an operation of determining whether the second images include a frame available at a second frame rate according to various embodiments.

Referring to FIG. 13, a second camera 1315 may be configured to be substantially identical or similar to the second camera 315 of FIG. 3. An FPS manager (e.g., including processing circuitry and/or program elements) 1340 may be configured to be substantially identical or similar to the FPS manager 340 of FIG. 3.

The FPS manager 1340 may determine whether second images acquired at the second frame rate through the second camera 1315 include a frame available at the second frame rate.

The FPS manager 1340 may analyze the second images acquired through the second camera 1315. For example, the FPS manager 1340 may analyze at least one frame included in the second images.

The FPS manager 1340 may extract a designated number of frames from among the frames included in the second images, and may analyze the extracted frames. For example, the FPS manager 1340 may extract one frame for every five frames, and may analyze the extracted frame.

The FPS manager 1340 may analyze the degree of brightness of the extracted frame, the motion of an external object included in the frame, and/or the degree movement of an external object included in the frame. For example, the FPS manager 1340 may determine that the second images include a frame available at the second frame rate, when, for example,: the degree of brightness of the extracted frame is greater than or equal to a designated brightness; the motion of an external object included in the frame is a designated motion; and the degree of movement of an external object included in the frame has a value greater than or equal to a designated value.

Figure 14:
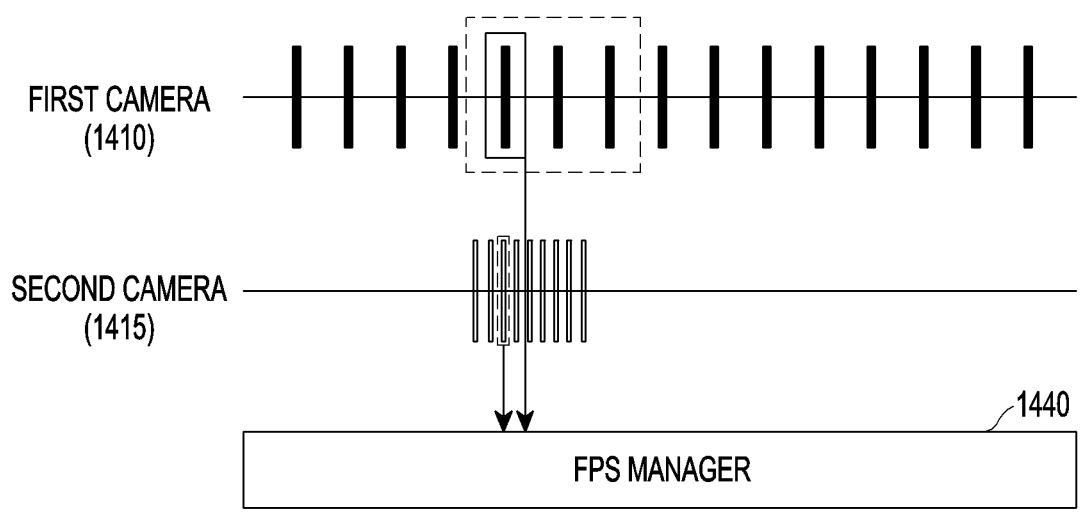
FIG. 14 is a block diagram illustrating an operation of determining whether second images include a frame available at a second frame rate according to various embodiments.

FIG. 14 is a block diagram illustrating an operation of determining whether second images include a frame available at a second frame rate according to various embodiments.

Referring to FIG. 14, a first camera 1410 and a second camera 1415 may be configured to be substantially identical or similar to the first camera 310 and the second camera 315 of FIG. 3. An FPS manager (e.g., including processing circuitry and/or program elements) 1440 may be configured to be substantially identical or similar to the FPS manager 340 of FIG. 3.

The FPS manager 1440 may compare first images acquired through the first camera 1410 with second images acquired through the second camera 1415, and may determine whether the second images include a frame available at the second frame rate, based on a comparison result.

The FPS manager 1440 may extract at least one first frame included in the first images, and may extract at least one second frame included in the second images.

The FPS manager 1440 may compare the at least one first frame with the at least one second frame, and may determine whether the second images include a frame available at the second frame rate, based on a comparison result. For example, the FPS manager 1440 may determine a degree of blur included in the at least one first frame and a degree of blur included in the at least one second frame. When the degree of blur included in the at least one second frame is less than the degree of blur included in the at least one first frame, the FPS manager 1440 may determine that the second images include a frame available at the second frame rate. On the other hand, when the degree of blur included in the at least one second frame is greater than the degree of blur included in the at least one first frame, the FPS manager 1440 may determine that the second images do not include a frame available at the second frame rate.

Figure 15:
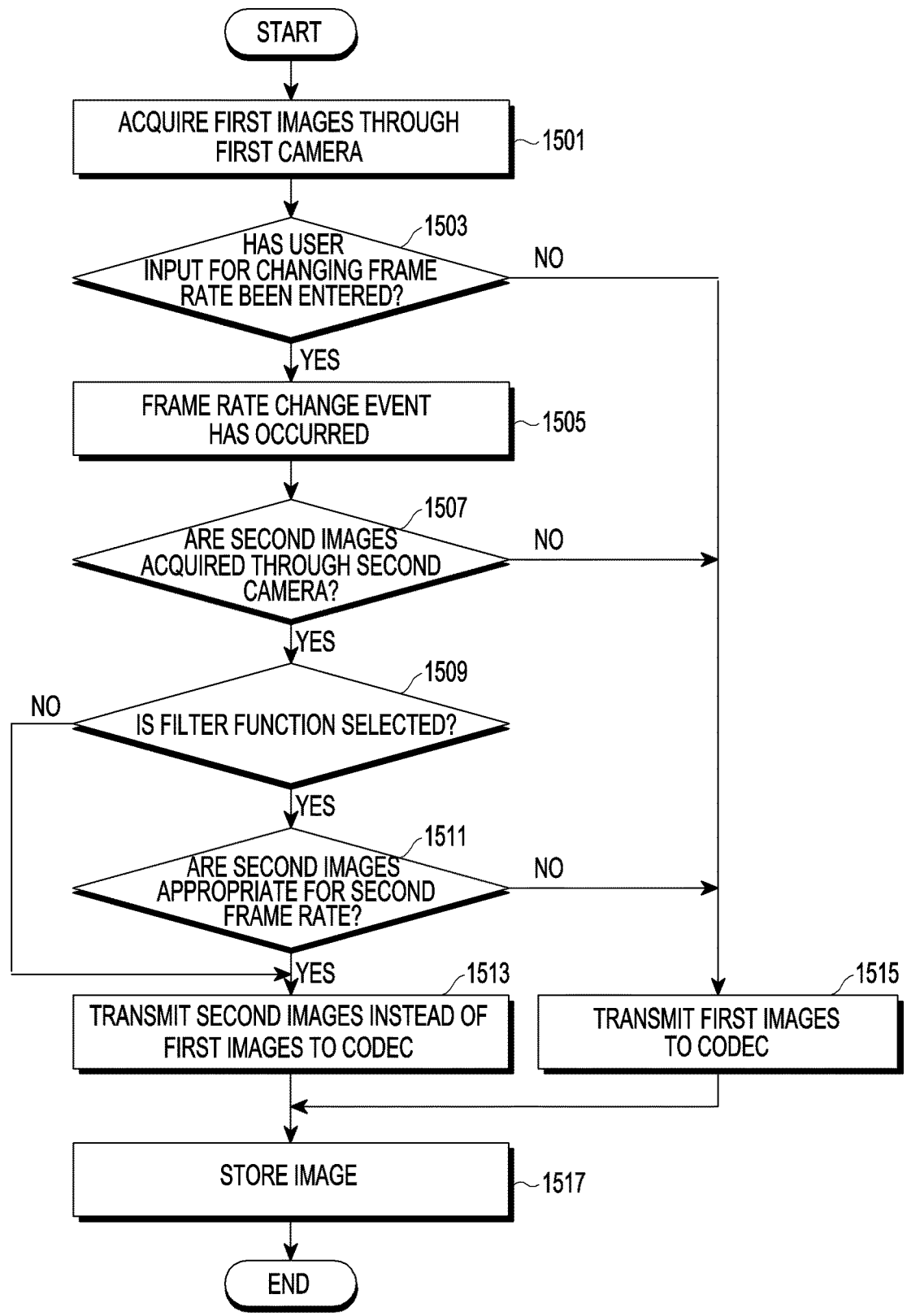
FIG. 15 is a flowchart illustrating an operation of an electronic device for changing a frame rate according to various embodiments.

FIG. 15 is a flowchart illustrating an operation of an electronic device for changing a frame rate according to various embodiments.

Referring to FIG. 15, in operation 1501, to record an image (or video) of an external object, the electronic device (the electronic device 301 of FIG. 3) (e.g., the processor 120 or 320) may acquire first images at a first frame rate through a first camera (the first camera 310 of FIG. 3). The electronic device 301 may transmit the first images of the first frame rate to a codec (e.g., the codec 345 of FIG. 3).

In operation 1503, the electronic device 301 may determine whether user input for changing a frame rate has been received. For example, the electronic device 301 may determine whether user input for changing the first frame rate to a higher frame rate has been received. The user input may include at least one of a touch input on a touch screen, an input through a soft key, and an input through a hardware key.

When the user input for changing the frame rate has not been received ('No' in operation 1503), the electronic device 301 may transmit the first images of the first frame rate to the codec (e.g., the codec 345 of FIG. 3) in operation 1515.

When the user input for changing the frame rate has been received ('Yes' in operation 1503), in operation 1505, the electronic device 301 may determine that a frame rate change event has occurred.

In response to the frame rate change event, the electronic device 301 may activate a second camera (the second camera 315 of FIG. 3).

In operation 1507, the electronic device 301 may acquire second images at a second frame rate through the second camera 315. For example, until second images are acquired through the second camera 315, the electronic device 301 may transmit the first images to the codec 345.

When the second images are acquired, in operation 1509, the electronic device 301 may determine whether a filter function is selected. For example, a filter function may signify the function for activating (e.g., performing) or deactivating (e.g., not performing) an operation of determining whether frames included in the second images are appropriate for the second frame rate. For example, when a filter function is selected, the electronic device 301 may activate an operation of determining whether frames included in the second images include a frame available at the second frame rate. On the other hand, when the filter function is not selected, the electronic device 301 may deactivate the operation of determining whether frames included in the second images include a frame available at the second frame rate.

When the filter function is not selected ('No' in operation 1509), in operation 1513, without determining whether at least one frame included in the second images is a frame available at the second frame rate, the electronic device 301 may transmit the second images instead of the first images to the codec 345.

When the filter function is selected ('Yes' in operation 1509), the electronic device 301 may determine whether the at least one frame included in the second images is a frame available at the second frame rate in operation 1511.

When the at least one frame included in the second images is not a frame available at the second frame rate ('No' in operation 1511), in operation 1515, the electronic device 301 may transmit the first images instead of the second images to the codec 345. In the present example, the electronic device 301 may delete the second images.

In operation 1517, the electronic device 301 may store an image corresponding to the external object using only the first images.

When the at least one frame included in the second images is a frame available at the second frame rate ('Yes' in operation 1511), in operation 1513, the electronic device 301 may transmit the second images instead of the first images to the codec 345.

In operation 1517, the electronic device 301 may store an image corresponding to the external object using at least some of the first images and second images.

FIGS. 16A, 16B, 16C and 16D are diagrams illustrating a user interface for an operation of changing a frame rate according to various embodiments.

Referring to FIGS. 16A, 16B, 16C and 16D, an electronic device 1601 may be configured to be substantially identical or similar to the electronic device 301 of FIG. 3. The electronic device 1601 may display a user interface capable of capturing an external object on a touch screen (e.g., the display apparatus 160 of FIG. 1).

Figure 16A:
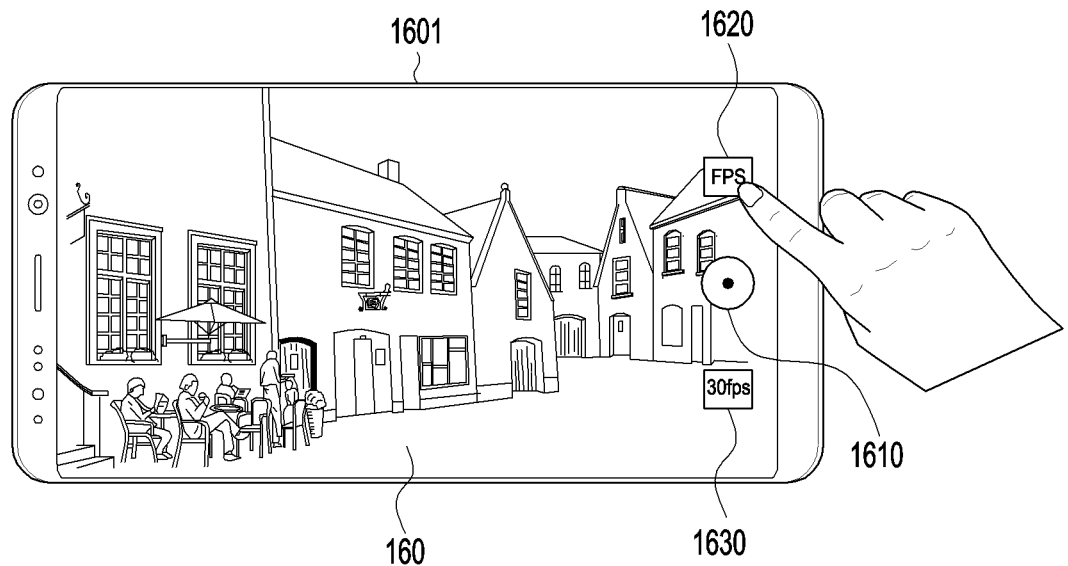
FIGS. 16A, 16B, 16C and 16D are diagrams illustrating a user interface for an operation of changing a frame rate according to various embodiments.

Referring to FIG. 16A, when a touch input on a recording object 1610 displayed on the touch screen 160 is received, the electronic device 1601 may start a recording operation. Also, when a touch input on the recording object 1610 is received during a recording operation, the electronic device 1601 may stop the recording operation.

When a touch input on the recording object 1610 displayed on the touch screen 160 is received, the electronic device 1601 may acquire first images through a first camera (e.g., the first camera 310 of FIG. 3).

According to an embodiment, during a recording operation, the electronic device 1601 may display a change object 1620 for changing the frame rate. When a touch input on the change object 1620 is entered by a user, the electronic device 1601 may perform an operation of changing the frame rate. For example, when a touch input on the change object 1620 is entered by the user, the electronic device 1601 may acquire second images through a second camera (e.g., the second camera 315 of FIG. 3).

According to an embodiment, even when a touch input on the change object 1620 is not entered by the user, the electronic device 1601 may perform an operation of changing the frame rate. For example, the electronic device 1601 may analyze the first images, and may acquire second images through the second camera (e.g., the second camera 315 of FIG. 3) according to the analysis result.

During a recording operation, the electronic device 1601 may display information 1630 on the frame rate at which an image is captured. For example, the electronic device 1601 may display the frame rate (e.g., 30 fps), at which an image is currently being captured, through the information 1630 on the frame rate.

Figure 16B:
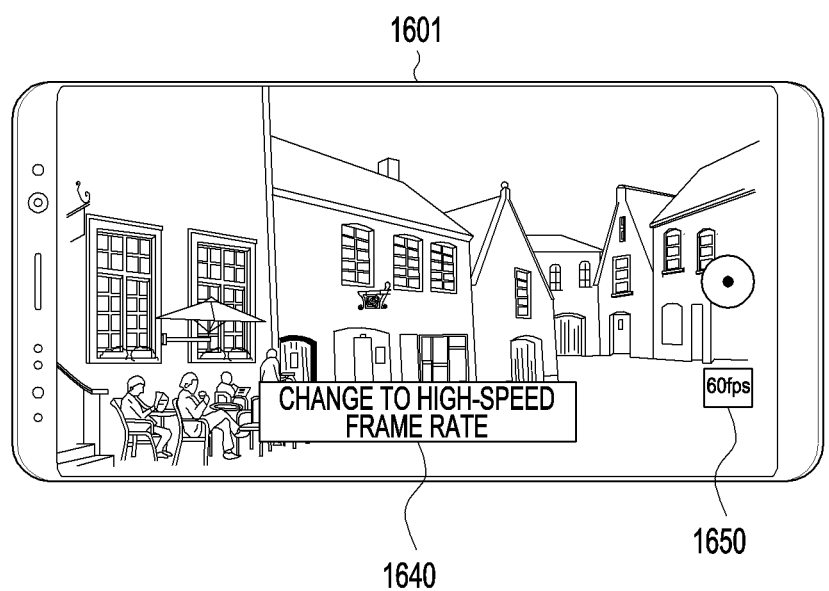

Referring to FIG. 16B, when a frame rate change is completed, the electronic device 1601 may display a pop-up window 1640 notifying of the frame rate change.

When a frame rate change is completed, the electronic device 1601 may display the frame rate (e.g., 60 fps), at which an image is currently being captured, through information 1650 on the frame rate.

Figure 16C:
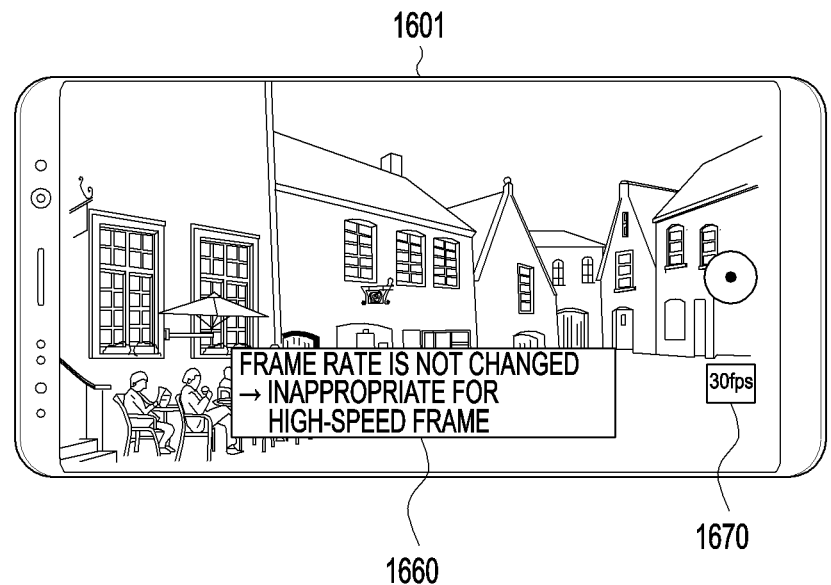

Referring to FIG. 16C, when the frame rate is not changed, the electronic device 1601 may display a pop-up window 1660 which provides a notification that the frame rate has not changed. Also, the electronic device 1601 may indicate the reason why the frame rate has not changed, in the pop-up window 1660. For example, the electronic device

1601 may display, on a pop-up window, that second images are inappropriate for the second frame rate (or a high-speed frame).

When a frame rate change is not completed, the electronic device 1601 may display the frame rate (e.g., 30 fps), at which an image is currently being captured, through information 1670 on the frame rate.

Figure 16D:
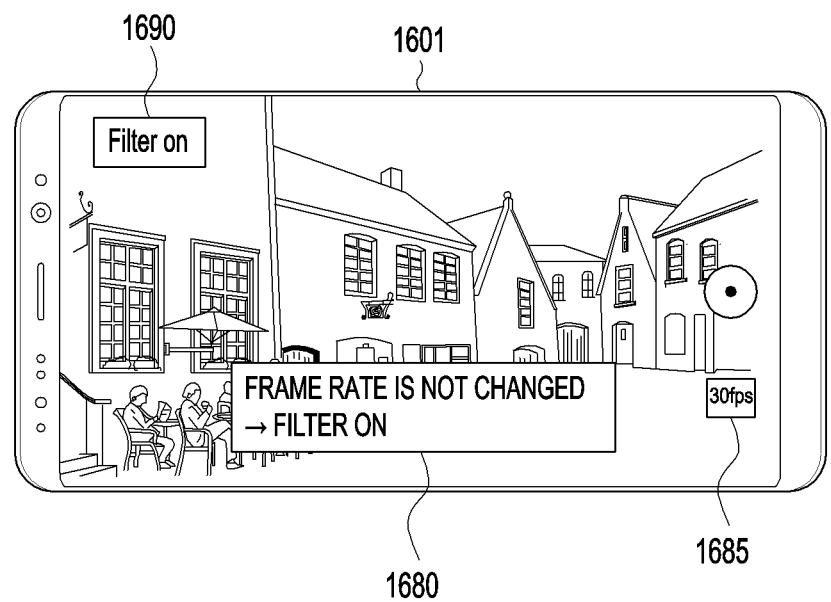

Referring to FIG. 16D, when the frame rate is not changed, the electronic device 1601 may display a pop-up window 1680 which provides a notification that the frame rate has not changed. Also, the electronic device 1601 may indicate the reason why the frame rate has not changed, in the pop-up window 1680. For example, the electronic device 1601 may display, on the pop-up window 1680, that a filter function is selected.

The electronic device 1601 may display a filter object 1690 which represents a filter function. For example, when a filter function is selected, the electronic device 1601 may display "Filter on", and when the filter function is not selected, may display "Filter off". For example, when a touch input on the filter object 1690 is received, the electronic device 1601 may or may not select a filter function.

The electronic device 1601 may display the frame rate (e.g., 30 fps), at which an image is currently being captured, through information 1685 on the frame rate.

An electronic device, according to various embodiments, may include: a first camera configured to acquire an image at a first frame rate; a second camera configured to acquire an image at a second frame rate, the second frame rate being higher than the first frame rate; a memory; and a processor, wherein the processor is configured to: identify first capturing attributes corresponding to the first camera; set at least some of second capturing attributes, the second capturing attributes corresponding to the second camera, to correspond to the first capturing attributes; acquire a first image set corresponding to an external object through the first camera based on a signal for capturing the external object; determine whether a designated condition related to a frame rate increase is satisfied; acquire a second image set corresponding to the external object at the second frame rate through the second camera when the designated condition is satisfied; and store, in the memory, at least some first images from the first image set and at least some second images from the second image set, as an image corresponding to the external object.

The processor may be configured to set the first capturing attributes and the second capturing attributes so that the first camera and the second camera have an identical view angle.

The processor may be configured to determine that the designated condition is satisfied when an input for increasing a frame rate is received while the first image set is acquired.

The processor may be configured to analyze frames of the at least some first images from the first image set and determine that the designated condition is satisfied, based on an analysis result.

The processor may be configured to determine whether the frames are appropriate for the second frame rate, based on at least one of the illuminance of the frames and a motion included in the frames.

The processor may be configured to store the first image set in a buffer while the second image set is acquired when the designated condition is satisfied.

The processor may be configured to analyze frames of the at least some second images from the second image set and store the image corresponding to the external object using the at least some second images from the second image set, based on whether the analyzed frames are appropriate for the second frame rate.

The processor may be configured to delete the first image set stored in the memory when the second image set is appropriate for the second frame rate.

The processor may be configured to store the image corresponding to the external object using the first image set stored in the memory without using the second image set when the second image set is inappropriate for the second frame rate.

The processor may be configured to transmit, to a coder/decoder (codec), the at least some first images from the first image set and the at least some second images from the second image set, to generate the image corresponding to the external object.

An operating method of an electronic device according to various embodiments may include: identifying first capturing attributes of a first camera configured to acquire an image at a first frame rate; setting at least some of second capturing attributes of a second camera configured to acquire an image at a second frame rate higher than the first frame rate, to correspond to the first capturing attributes; acquiring a first image set corresponding to an external object through the first camera based on a signal for capturing the external object; determining whether a designated condition related to a frame rate increase is satisfied; acquiring a second image set corresponding to the external object at the second frame rate through the second camera when the designated condition is satisfied; and storing at least some first images from the first image set and at least some second images from the second image set, as an image corresponding to the external object.

Setting the at least some of the second capturing attributes of the second camera may include setting the first capturing attributes and the second capturing attributes so that the first camera and the second camera have an identical view angle.

Determining whether the designated condition related to the frame rate increase is satisfied may include determining that the designated condition is satisfied when an input for increasing a frame rate is received while the first image set is acquired.

Determining whether the designated condition related to the frame rate increase is satisfied may include analyzing frames of the at least some first images from the first image set and determining that the designated condition is satisfied, based on the analysis result.

Analyzing the frames of the at least some first images from the first image set may include determining whether the frames are appropriate for the second frame rate, based on at least one of the illuminance of the frames and a motion included in the frames.

The operating method of the electronic device may further include storing the first image set in a buffer while the second image set is acquired when the designated condition is satisfied.

Storing the at least some first images from the first image set and the at least some second images from the second image set, as the image corresponding to the external object, may include analyzing frames of the at least some second images from the second image set and storing the image corresponding to the external object using the at least some second images from the second image set, based on whether the analyzed frames are appropriate for the second frame rate.

The operating method of the electronic device may further include deleting the stored first image set when the second image set is appropriate for the second frame rate.

Storing the at least some first images from the first image set and the at least some second images from the second image set, as the image corresponding to the external object, may include storing the image corresponding to the external object using the stored first image set without using the second image set when the second image set is inappropriate for the second frame rate.

An electronic device according to various embodiments may include: a first camera; a second camera; a memory; and a processor, wherein the processor is configured to: configure the first and second cameras to be operable when a request is made for recording an image of an external object; acquire first images at a first frame rate through the first camera; acquire second images at a second frame rate higher than the first frame rate through the second camera, in response to a command for changing the first frame rate; and store the image of the external object in a memory using at least some of the first images and at least some of the second images when at least some of the second images satisfy a designated condition related to the second frame rate.

Each of the above-described elements of the electronic device may be implemented by one or more components, and the names of the corresponding elements may vary according to the type of electronic device. In various embodiments, an electronic device may include at least one of the above-described elements. Some elements may be omitted from the electronic device, or other additional elements may be further included therein. Also, some of the elements of the electronic device according to various embodiments may be combined into one entity so as to perform functions identical to those of the relevant elements before the combination.

Additionally, the embodiments disclosed herein are provided merely to easily describe technical details of the present disclosure and to help the understanding of the present disclosure, and are not intended to limit the scope of the present disclosure. Therefore, the scope of the present disclosure should be understood to include all modifications and changes or other various embodiments based on the technical idea of the present disclosure.

What is claimed is:

1. An electronic device comprising:
a first camera;
a second camera;
a memory; and
a processor,
wherein the processor is configured to:
identify first capturing attributes corresponding to the first camera;
set at least some of second capturing attributes corresponding to the second camera, to correspond to the first capturing attributes;
acquire a first image set corresponding to an external object at a first frame rate through the first camera based on a signal for capturing the external object;
identify whether a designated condition related to a frame rate increase is satisfied;
acquire a second image set corresponding to the external object at a second frame rate through the second camera based on the least some of the second capturing attributes, when the designated condition is satisfied; and
store, in the memory, at least one first image from the first image set and at least one second image from the second image set, as an image corresponding to the external object,
wherein the second frame rate is higher than the first frame rate.

2. The electronic device of claim 1, wherein the processor is configured to set the first capturing attributes and the second capturing attributes so that the first camera and the second camera have an identical view angle.

3. The electronic device of claim 1, wherein the processor is configured to identify that the designated condition is satisfied when an input for increasing a frame rate is received while the first image set is acquired.

4. The electronic device of claim 1, wherein the processor is configured to identify that the designated condition is satisfied, based on the at least one first image from the first image set.

5. The electronic device of claim 4, wherein the processor is configured to identify that the designated condition is satisfied, based on at least one of: an illuminance of the at least one first image and a motion included in the at least one first image.

6. The electronic device of claim 1, wherein the processor is configured to store the first image set in a buffer while the second image set is acquired when the designated condition is satisfied.

7. The electronic device of claim 6, wherein the processor is configured to store the image corresponding to the external object using the at least some second images from the second image set, based on the at least one second image from the second image set.

8. The electronic device of claim 7, wherein the processor is configured to delete the first image set stored in the memory when the second image set is appropriate for the second frame rate.

9. The electronic device of claim 7, wherein the processor is configured to store the image corresponding to the external object using the first image set stored in the memory without using the second image set when the second image set is inappropriate for the second frame rate.

10. The electronic device of claim 1, wherein the processor is configured to transmit, to a coder/decoder, the at least one first image from the first image set and the at least one second image from the second image set, to generate the image corresponding to the external object.

11. An operating method of an electronic device, the operating method comprising:
identifying first capturing attributes of a first camera configured to acquire an image at a first frame rate;
setting at least some of second capturing attributes of a second camera configured to acquire an image at a second frame rate higher than the first frame rate, to correspond to the first capturing attributes;
acquiring a first image set corresponding to an external object through the first camera based on a signal for capturing the external object;
identifying whether a designated condition related to a frame rate increase is satisfied;
acquiring a second image set corresponding to the external object at the a second frame rate through the second camera based on the at least some of the second capturing attributes, when the designated condition is satisfied; and
storing at least some first images from the first image set and at least some second images from the second image set, as an image corresponding to the external object, wherein the second frame rate is higher than the first frame rate.

12. The operating method of claim 11, wherein the setting of the at least some of the second capturing attributes of the second camera comprises setting the first capturing attributes and the second capturing attributes so that the first camera and the second camera have an identical view angle.

13. The operating method of claim 11, wherein the determining of whether the designated condition related to the frame rate increase is satisfied comprises determining that the designated condition is satisfied when an input for increasing a frame rate is received while the first image set is acquired.

14. The operating method of claim 11, wherein the determining of whether the designated condition related to the frame rate increase is satisfied comprises analyzing frames of the at least some first images from the first image set and determining that the designated condition is satisfied, based on an analysis result.

15. The operating method of claim 14, wherein the analyzing of the frames of the at least some first images from the first image set comprises determining whether the frames are appropriate for the second frame rate, based on at least one of: an illuminance of the frames and a motion included in the frames.

16. The operating method of claim 11, further comprising storing the first image set in a buffer while the second image set is acquired when the designated condition is satisfied.

17. The operating method of claim 16, wherein the storing of the at least some first images from the first image set and the at least some second images from the second image set, as the image corresponding to the external object comprises analyzing frames of the at least some second images from the second image set and storing the image corresponding to the external object using the at least some second images from the second image set, based on whether the analyzed frames are appropriate for the second frame rate.

18. The operating method of claim 17, further comprising deleting the stored first image set when the second image set is appropriate for the second frame rate.

19. The operating method of claim 17, wherein the storing of the at least some first images from the first image set and the at least some second images from the second image set, as the image corresponding to the external object comprises storing the image corresponding to the external object using the stored first image set without using the second image set when the second image set is inappropriate for the second frame rate.

20. An electronic device comprising:
a first camera;
a second camera;
a memory; and
a processor,
wherein the processor is configured to:
set the first camera and the second camera to be operable in response to a request for recording an image of an external object;
acquire first images at a first frame rate through the first camera;
acquire second images at a second frame rate higher than the first frame rate through the second camera based on at least some of the second capturing attributes corresponding to the second camera in response to a command for changing a frame rate; and
store the image of the external object in a memory using at least one first image and the at least one second image when at least one second image satisfy a designated condition related to the second frame rate,
wherein at least some of the second capturing attributes are set based on the first capturing attributes.

* * * * *